United States Patent
Matsumoto

(10) Patent No.: US 10,994,424 B2
(45) Date of Patent: May 4, 2021

(54) TOOL EXCHANGE DEVICE AND TOOL EXCHANGE SYSTEM

(71) Applicant: NITTA CORPORATION, Osaka (JP)

(72) Inventor: Ryosuke Matsumoto, Nabari (JP)

(73) Assignee: NITTA CORPORATION, Osaka (JP)

( * ) Notice: Subject to any disclaimer, the term of this patent is extended or adjusted under 35 U.S.C. 154(b) by 243 days.

(21) Appl. No.: 16/095,627

(22) PCT Filed: Apr. 12, 2017

(86) PCT No.: PCT/JP2017/014940
§ 371 (c)(1),
(2) Date: Oct. 22, 2018

(87) PCT Pub. No.: WO2017/187979
PCT Pub. Date: Nov. 2, 2017

(65) Prior Publication Data
US 2019/0126494 A1 May 2, 2019

(30) Foreign Application Priority Data

Apr. 28, 2016 (JP) .............................. JP2016-091740

(51) Int. Cl.
*B25J 19/02* (2006.01)
*B25J 15/04* (2006.01)
(Continued)

(52) U.S. Cl.
CPC ......... *B25J 15/0466* (2013.01); *B25J 13/086* (2013.01); *B25J 15/0019* (2013.01);
(Continued)

(58) Field of Classification Search
CPC .. B25J 15/0466; B25J 15/0483; B25J 13/086; B25J 15/0425; B25J 15/0019; B25J 19/027; G01D 11/30
See application file for complete search history.

(56) References Cited

U.S. PATENT DOCUMENTS

| 4,632,352 A * | 12/1986 | Stoll ..................... G01D 11/30 |
| | | 248/313 |
| 2004/0180769 A1 | 9/2004 | Perry et al. |
| 2017/0331473 A1* | 11/2017 | Wineland ........... H03K 17/9505 |

FOREIGN PATENT DOCUMENTS

| JP | S63-052985 | 3/1988 |
| JP | H06-039766 | 2/1994 |
| | (Continued) | |

OTHER PUBLICATIONS

International Search Report dated Jul. 11, 2017 in International Application No. PCT/JP2017/014940.

*Primary Examiner* — Eric A. Gates
*Assistant Examiner* — Paul M Janeski
(74) *Attorney, Agent, or Firm* — Wentsler LLC

(57) ABSTRACT

Provided are a tool exchange device and a tool exchange system that enable management of a coupling state according to a tool to be fixed. A tool exchange device including a male member to be detachably attached to an apparatus side and a female member to be detachably attached to a tool side includes: a proximity sensor provided in the male member; and a target provided in the female member, the target corresponding to the proximity sensor, and the target is provided in the female member in such a manner that a distance between the target and the proximity sensor in a state in which the male member and the female member are coupled together is adjustable.

4 Claims, 3 Drawing Sheets

(51) Int. Cl.
*B25J 13/08* (2006.01)
*B25J 15/00* (2006.01)

(52) U.S. Cl.
CPC ....... *B25J 15/0425* (2013.01); *B25J 15/0483* (2013.01); *B25J 19/027* (2013.01)

(56) References Cited

FOREIGN PATENT DOCUMENTS

| | | |
|---|---|---|
| JP | H07-290392 | 11/1995 |
| JP | H09-088921 | 3/1997 |
| JP | 2013-173461 | 9/2013 |
| JP | 2014-217909 | 11/2014 |
| JP | 2015-000449 | 1/2015 |

\* cited by examiner

TOOL EXCHANGE DEVICE AND TOOL EXCHANGE SYSTEM

TECHNICAL FIELD

The present invention relates to a tool exchange device and a tool exchange system and specifically relates to those employed for an industrial robot.

BACKGROUND

As tool exchange devices to be employed for various apparatuses, for example, industrial robots, those including a male member to be attached to the industrial robot side and a female member to be attached to the tool side are disclosed (for example, Patent Literature 1). In the tool exchange devices, upon a cam being engaged with an engaging component in a state in which a projection portion is inserted in a coupling hole, the male member and the female member are coupled together. Also, disengagement between the cam and the engaging component allows decoupling between the male member and the female member. In such a manner as above, the tool exchange devices enable exchange of tools attached to an industrial robot.

In such tool exchange devices, a proximity sensor may be provided in order to confirm that the male member and the female member are properly coupled together (for example, Patent Literature 1).

CITATION LIST

Patent Literature

Patent Literature 1: Japanese Patent Laid-Open No. 2015-449

SUMMARY OF INVENTION

Technical Problem

However, in the tool exchange device according to the aforementioned patent literature, a distance between the proximity sensor and a target in a state in which the male member and the female member are coupled together is uniform and thus there is a problem in that only uniform management can be performed for different tools.

An object of the present invention is to provide a tool exchange device and a tool exchange system that enable management of a coupling state according to a tool to be fixed.

Solution to Problem

A tool exchange device according to the present invention is a tool exchange device including a male member to be detachably attached to an apparatus side and a female member to be detachably attached to a tool side, the tool exchange device including: a proximity sensor provided in the male member; and a target provided in the female member, the target corresponding to the proximity sensor, wherein the target is provided in the female member in such a manner that a distance between the target and the proximity sensor in a state in which the male member and the female member are coupled together is adjustable.

A tool exchange system according to the present invention includes the above-stated tool exchange device, and a plurality of the female members to be attached respectively to two or more tools are provided for one said male member, and a distance between the target installed at each female member and the proximity sensor is adjusted according to the relevant tool.

Advantageous Effect of Invention

According to the present invention, a distance from a proximity sensor to a target can be set depending on a tool by adjusting the distance on the female member side, enabling management of a coupling state according to a tool to be fixed.

DESCRIPTION OF EMBODIMENT

An embodiment of the present invention will be described in detail with reference to the drawings.

Figure 1:
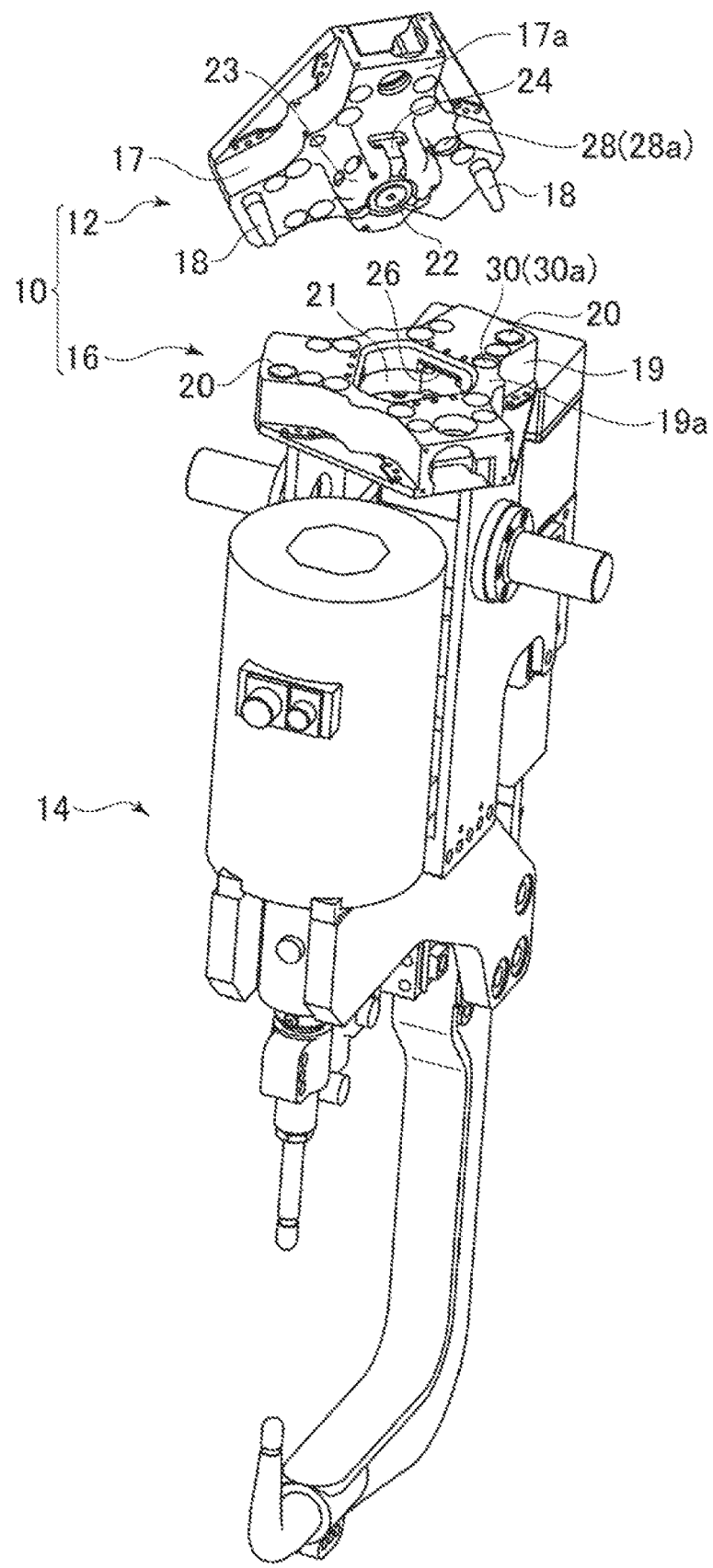
FIG. 1 is a perspective diagram illustrating a state of use of a tool exchange device according to the present embodiment.

A tool exchange system includes a tool exchange device 10, which is illustrated in FIG. 1. The tool exchange device 10 includes a male member 12 fixed to a distal end of an arm (not illustrated) of an industrial robot (hereinafter referred to as "robot"), which is an apparatus, and female members 16 fixed to a plurality of tools 14. In this case, the female members 16 are fixed to the respective tools 14.

The male member 12 is accurately positioned relative to a female member 16 by inserting positioning pins 18 provided at a male member body 17 into positioning holes 20 formed in a female member body 19 of the female member 16. Although a tool 14 is not specifically limited, a spot welding gun is illustrated in the figure. The male member 12 and the arm are detachably fastened together by a non-illustrated fastening tool, for example, a bolt, and the female member 16 and the tool 14 are detachably fastened together by a non-illustrated fastening tool, for example, a bolt. The arm and the tool 14 can be coupled and decoupled via the tool exchange device 10.

In the male member body 17, a rod 22, a plurality of (three in the case of the present embodiment) cams 24 interlocked with the rod 22 and a proximity sensor 28 are provided. The rod 22 is provided in the male member body 17 so as to be capable of linearly moving in a thickness direction of the male member body 17. Although not illustrated, a piston is coupled to an end of the rod 22 and thus the rod 22 is formed so as to be linearly moved, that is, be raised and lowered in the state illustrated in FIG. 1 by a compressed gas supplied by gas supply/exhaust means. The cams 24 are provided so as to be capable of being rotated by linear movement of the rod 22. Although not illustrated, the cams 24 are in contact with a disk-like portion (not illustrated) provided at another end of the rod 22, and upon the rod 22 being lowered, the cams 24 are housed in a projection portion 23 (FIG. 1), and upon the rod 22 being raised, the cams 24 project radially from the projection portion 23 (not illustrated).

The proximity sensor 28 is installed in such a manner that a sensor surface 28a is exposed on a male member contact surface 17a of the male member body 17. Upon detection of a detection target object, the proximity sensor 28 outputs a detection signal. Although not illustrated, the detection signal is output to a determination unit via a signal wire. For the proximity sensor 28, for example, an induction-type proximity sensor that detects presence of a metal can be used.

In the female member body 19, a plurality of (three in the case of the present embodiment) engaging components 26 and a target 30, which is a detection target object, are provided. In the female member body 19, a coupling hole 21 that opens in a thickness direction is formed. The engaging components 26 are provided at respective positions in an inner periphery of the coupling hole 21, the positions corresponding to respective positions of the cams 24. The target 30 is installed at a position corresponding to the proximity sensor 28 in such a manner that a target surface 30a is exposed on a female member contact surface 19a of the female member body 19.

Figure 2:
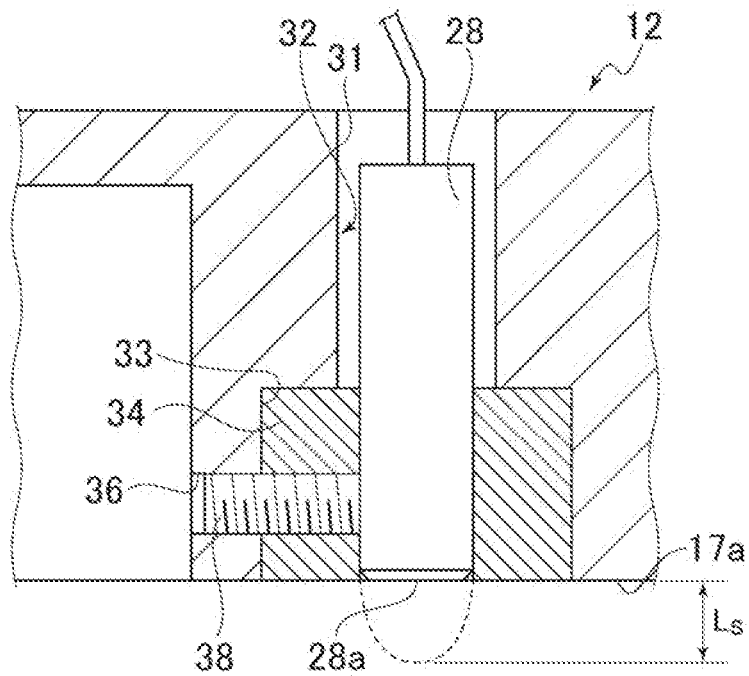
FIG. 2 is a longitudinal sectional view of a male member of the tool exchange device according to the present embodiment.

Means for installing the proximity sensor 28 at the male member body 17 will be described with reference to FIG. 2. In the male member body 17, a through hole 32 is formed in the thickness direction. The through hole 32 includes a hole portion 31 and a counterbore portion 33 having an inner diameter that is larger than that of the hole portion 31. The counterbore portion 33 is formed on the male member contact surface 17a side, and a cylindrical portion 34 that fills a gap between an inner circumference of the counterbore portion 33 and the proximity sensor 28 is pressed in the counterbore portion 33. For the cylindrical portion 34, a bush made of a synthetic resin may be used. For the cylindrical portion 34, a first female thread is formed at an inner circumference thereof and a second female thread is formed in a radial direction. In the male member body 17, a through hole 36 extending from an outer surface to the female thread of the cylindrical portion 34 is formed.

The proximity sensor 28 is screwed into the cylindrical portion 34 provided in the counterbore portion 33 from the hole portion 31 without the sensor surface 28a protruding from the male member contact surface 17a. A locking screw 38, which is a fastening portion, is screwed toward the proximity sensor 28 from the outer surface of the male member body 17. A distal end of the locking screw 38 is brought into contact with a surface of the proximity sensor 28 and the locking screw 38 thereby fixes the proximity sensor 28 to the male member body 17. As described above, the proximity sensor 28 is positioned in such a manner that the sensor surface 28a at the distal end thereof does not protrude from the male member contact surface 17a of the male member body 17, in the case of the present embodiment, in such a manner that the sensor surface 28a and the male member contact surface 17a are flush with each other. A distance from the sensor surface 28a to a detection target object, within which the proximity sensor 28 can detect the detection target object, is referred to as "detection distance $(L_s)$".

Figure 3:
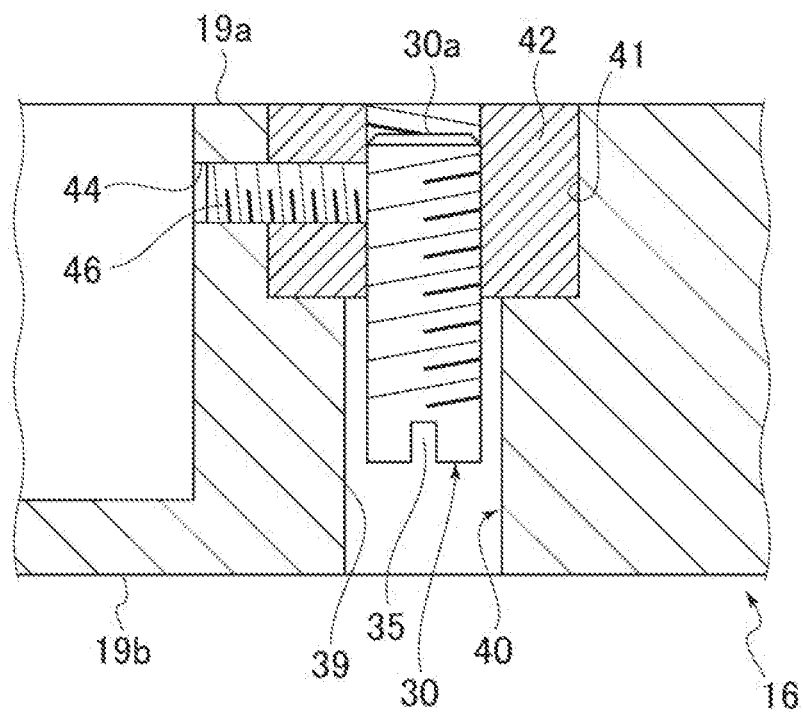
FIG. 3 is a longitudinal sectional view of a female member of the tool exchange device according to the present embodiment.

Means for installing the target 30 at the female member body 19 will be described with reference to FIG. 3. In the female member body 19, a through hole 40 is formed in the thickness direction. The through hole 40 includes a hole portion 39 and a counterbore portion 41 having an inner diameter that is larger than that of the hole portion 39. The counterbore portion 41 is formed on the female member contact surface 19a side, and a cylindrical portion 42 that fills a gap between an inner circumference of the counterbore portion 41 and the target 30 is pressed in the counterbore portion 41. The cylindrical portion 42 has a configuration that is similar to that of the cylindrical portion 34 and thus description thereof will be omitted. In the female member body 19, a through hole 44 extending from an outer surface to the second female thread is formed.

The target 30 is a cylindrical member formed of a metal, for example, iron, aluminum, brass or copper, a male thread is formed over an entire outer circumference thereof, and a slot groove 35 is formed in a proximal end thereof. The target 30 is screwed into the cylindrical portion 42 provided in the counterbore portion 41 from the hole portion 39 without the target surface 30a protruding from the female member contact surface 19a. A locking screw 46, which is a fastening portion, is screwed toward the target 30 from the outer surface of the female member body 19. A distal end of the locking screw 46 is brought into contact with a surface of the target 30 and the locking screw 46 thereby fixes the target 30 to the female member body 19. As described above, the target 30 is positioned at a desired position without the target surface 30a at the distal end protruding from the female member contact surface 19a of the female member body 19.

Figure 4:
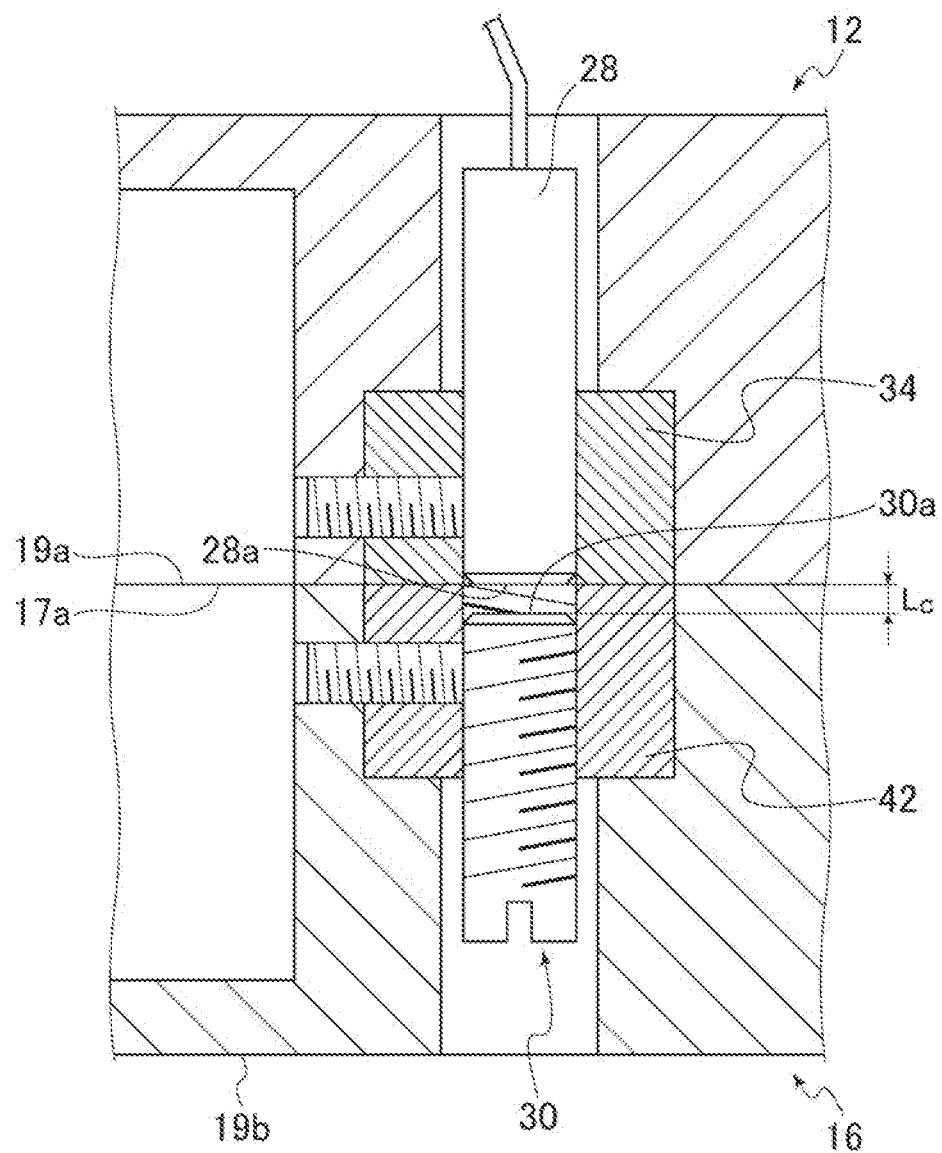
FIG. 4 is a longitudinal sectional view illustrating a state of use of the tool exchange device according to the present embodiment.

As illustrated in FIG. 4, a distance from the sensor surface 28a to the target surface 30a in a state in which the male member 12 and the female member 16 are coupled together is referred to as "set distance $(L_c)$". The set distance $(L_c)$ is appropriately selected within the detection distance $(L_s)$.

Next, an operation of coupling the male member 12 and the female member 16 will be described. The tool 14 is placed at a non-illustrated tool holder in a state in which the female member 16 is fixed to the tool 14. The male member 12 is brought into a state in which the cams 24 are housed in the projection portion 23 by lowering the rod 22. In this state, the arm is stretched to place the male member 12 and the female member 16 on a same axis and thereby position the male member 12 and the female member 16.

Next, the projection portion 23 of the male member 12 is inserted into the coupling hole 21 of the female member 16 until the male member contact surface 17a comes into contact with the female member contact surface 19a. After the insertion, the rod 22 is raised and, the cams 24 are thus rotated and radially protrude from the projection portion 23 and engage with the engaging components 26. Consequently, the male member 12 and the female member 16 are coupled together (FIG. 4). When the male member 12 is coupled to the female member 16, the set distance $(L_c)$ falls within the detection distance $(L_s)$, and thus the proximity sensor 28 detects the presence of the target 30 and outputs a detection signal.

Next, the arm (not illustrated) is bent or stretched to move the tool 14 via the tool exchange device 10 and sets the tool 14 to a predetermined position, and the tool 14 is caused to perform predetermined work, for example, spot welding.

After the end of the operation, the robot returns the tool 14 to the tool holder. The tool exchange device 10 is brought into a state in which the cams 24 are housed in the projection portion 23 by lowering the rod 22. As a result of the cams 24 being housed in the projection portion 23, the cams 24 and the engaging components 26 are disengaged from each other. Upon the robot pulling the arm up, the male member 12 and the female member 16 are separated from each other and the male member 12 is thus brought into a state in which the male member 12 can be coupled to a female member 16 fixed to another tool 14.

When the arm pulls a tool 14 up in a state in which the male member 12 and the relevant female member 16 are coupled together, a force in a direction in which the male member 12 and the female member 16 are pulled away from each other is exerted between the male member 12 and the female member 16 because of the weight of the tool 14. This force may cause a gap to be formed between the male member 12 and the female member 16.

Also, for example, where the tool 14 is directed horizontally by stretching the arm, moment according to the distance from a point between the male member 12 and the female member 16 to the center of gravity of the tool 14 and the weight of the tool 14 is generated between the male member 12 and the female member 16. This moment may cause inclination between the male member 12 and the female member 16.

If the gap is formed or the inclination occurs, the set distance ($L_c$) changes to ($L_c+\Delta L_c$). As described above, the initially-set set distance ($L_c$) changes depending on, e.g., a frequency and/or a manner of use of the tool 14 fixed to the female member 16. If the gap or the inclination exceeds a range in which the gap or the inclination does not affect accuracy, the tool exchange device 10 cannot cause the tool 14 to work with predetermined accuracy. It is preferable that the set distance ($L_c$) is set so as to fall within the range in which the gap or the inclination does not affect the accuracy.

If the set distance ($L_c+\Delta L_c$) changed as a result of the formation of the gap or the occurrence of the inclination exceeds the detection distance ($L_s$), the proximity sensor 28 cannot detect presence of the target 30 and thus stops the output of the detection signal. Upon detection of the stoppage of the detection signal, the determination unit (not illustrated) determines that the gap or the inclination exceeds the range in which the gap or the inclination does not affect the accuracy. Then, based on a result of the determination by the determination unit, the robot returns the tool 14 to the tool holder and notifies a user of a need for maintenance, such as replacement of the cams 24 and/or the engaging components 26.

Since the target 30 is screwed into the cylindrical portion 42 provided in the female member 16, the set distance ($L_c$) can easily be adjusted on the tool 14 side rather than the robot side. Therefore, the tool exchange device 10 sets the set distance ($L_c$) for each tool 14, enabling management of a coupling state according to a tool 14 to be fixed.

Since the gap or the inclination differs depending on the weight or the position of the center of gravity of the tool 14 and causes accuracy decrease in work, such as spot welding, performed by the tool 14, it is desirable to strictly manage a coupling state for each tool 14. On the other hand, the effect of the gap or the inclination on the accuracy differs depending on, e.g., the size of the tool 14 and the accuracy demanded for work such as spot welding also differs depending from tool 14 to tool 14.

Since in the tool exchange system, the set distance ($L_c$) is adjusted on the tool 14 side, that is, the position of the target 30 provided in the female member 16 is adjusted, the set distance ($L_c$) can be set for each tool 14. Therefore, the tool exchange system enables determination of a more proper maintenance timing for each tool 14.

In the case of the present embodiment, the target 30 can be screwed into the cylindrical portion 42 by inserting a flathead screwdriver into the hole portion 39 from the surface 19b side, which is the opposite side of the female member contact surface 19a. Therefore, the tool exchange device 10 enables a desired set distance ($L_c$) to be set by adjusting the position of a target 30 while checking a detection signal output by the proximity sensor 28 in a state in which the male member 12 and the relevant female member 16 are coupled together.

(Alterations)

The present invention is not limited to the above-described embodiment and changes may be arbitrarily made within the spirit of the present invention.

Although the case where the set distance ($L_c$) is adjusted on the tool 14 side depending on the amount of insertion of the target 30 into the cylindrical portion 42 has been described, the present invention is not limited to this case and the set distance ($L_c$) can also be adjusted by changing a material that forms the target 30.

Although the case where the proximity sensor 28 is an induction-type proximity sensor has been described, the present invention is not limited to this case and the proximity sensor 28 may be arbitrarily selected according to the material of the target 30. For example, if the target 30 is made of a metal or a resin, a capacitance-type proximity sensor can be used. Also, if the target 30 is made of a magnet, a magnetic proximity sensor can be used.

Although the target 30 has been described in terms of the case where the slot groove 35 is formed in the other end of the target 30, the present invention is not limited to this case and a cross groove or a hexagon socket may be formed in the other end.

REFERENCE SIGNS LIST 10 tool exchange device
12 male member
14 tool
16 female member
17 male member body
28 proximity sensor
28a sensor surface
30 target
30a target surface
34 cylindrical portion
38 locking screw (fastening portion)
42 cylindrical portion
46 locking screw (fastening portion)

The invention claimed is:

1. A tool exchange device including a male member to be detachably attached to an apparatus side and a female member to be detachably attached to a tool side, the tool exchange device comprising:
   a proximity sensor provided in the male member;
   a cylindrical portion installed in a through hole formed in the female member; and
   a target inserted in the cylindrical portion, the target corresponding to the proximity sensor,
   wherein
      a first female thread is formed at an inner circumference of the cylindrical portion;
      a male thread is formed at an outer circumference of the target, the male thread corresponding to the first female thread;
      the target is provided in the female member in such a manner that a distance between the target and the proximity sensor in a state in which the male member and the female member are coupled together is adjustable, wherein a position of the target is adjustable in a state in which the male member and the female member are coupled together by screwing the target into the cylindrical portion from a surface side which is an opposite side of a female member contact surface of the female member.

2. The tool exchange device according to claim 1, wherein:
a second female thread is formed in the cylindrical portion in a radial direction;
a through hole is formed in the female member to extend the second female thread from an outer surface of the female member; and
a locking screw as a fastening portion is screwed in the through hole toward the target from the outer surface of the female member, the locking screw fixes the target to the female member by bringing a distal end of the locking screw into contact with a surface of the target.

3. A tool exchange system comprising the tool exchange device according to claim 1, wherein:
a plurality of the female members to be attached respectively to two or more tools are provided for one said male member; and
a distance between the target installed at each female member and the proximity sensor is adjusted according to the tool.

4. The tool exchange device according to claim 1, wherein:
the proximity sensor is positioned in such a manner that a sensor surface at a distal end of the proximity sensor does not protrude from a male member contact surface of the male member; and
the target is positioned such a manner that a target surface at a distal end of the target does not protrude from the female member contact surface.

* * * * *